(12) United States Patent
Mourad et al.

(10) Patent No.: US 8,711,915 B2
(45) Date of Patent: Apr. 29, 2014

(54) METHOD FOR DETERMINING A CORRECTED VARIANCE REPRESENTATIVE OF THE CONDITION OF RECEPTION OF SIGNALS REPRESENTATIVE OF SYMBOLS

(75) Inventors: Alain Mourad, Rennes Cedex (FR); Damien Castelain, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1012 days.

(21) Appl. No.: 12/047,808

(22) Filed: Mar. 13, 2008

(65) Prior Publication Data

US 2008/0225934 A1 Sep. 18, 2008

(30) Foreign Application Priority Data

Mar. 15, 2007 (EP) ...................................... 07005381

(51) Int. Cl.
*H04B 17/00* (2006.01)

(52) U.S. Cl.
USPC ............................ 375/227; 375/224; 375/316

(58) Field of Classification Search
USPC .......................................... 375/227, 224, 316
See application file for complete search history.

(56) References Cited

U.S. PATENT DOCUMENTS

| 5,142,551 | A | * | 8/1992 | Borth et al. | ................... 375/219 |
| 6,006,110 | A | * | 12/1999 | Raleigh | ......................... 455/561 |
| 7,489,719 | B1 | * | 2/2009 | Giardina | ....................... 375/130 |
| 2003/0207695 | A1 | * | 11/2003 | Chang et al. | .................. 455/522 |
| 2006/0018410 | A1 | | 1/2006 | Onggosanusi et al. | |
| 2006/0109922 | A1 | | 5/2006 | Gorokhov et al. | |

FOREIGN PATENT DOCUMENTS

| DE | 102 05 742 C 1 | 12/2003 |
| EP | 1 748 610 A1 | 1/2007 |

\* cited by examiner

*Primary Examiner* — Michael Neff
(74) *Attorney, Agent, or Firm* — Oblon, Spivak, McClelland, Maier & Neustadt, L.L.P.

(57) ABSTRACT

A method for determining a corrected estimated variance representative of the condition of reception of signals representative of symbols transferred by an emitter to a receiver through a communication channel. The method includes, executed by the receiver, producing an estimation of the variance by a Wiener channel estimator comprising a linear filter of which coefficients are determined at least from a given average signal to interference plus noise ratio value. The method further includes, executed by the receiver, multiplying the estimation of the variance by a correction factor. The value of the correction factor, being dependent at least on the number of coefficients of the linear filter of the Wiener channel estimator.

13 Claims, 7 Drawing Sheets

| $SNR_W$(dB) | $\rho$(dB)(L=6) | $\rho$(dB)(L=10) | $\rho$(dB)(L=16) |
|---|---|---|---|
| 20 | -2.4 | -2.9 | -3.1 |
| 30 | -1.93 | -2.5 | -2.8 |
| 40 | -1.15 | -2.0 | -2.6 |
| 50 | -0.27 | -1.9 | -2.6 |

| $SNR_W$(dB) | $\beta$(dB)(L=6) | $\beta$(dB)(L=10) | $\beta$(dB)(L=16) |
|---|---|---|---|
| 20 | -4.4 | -3.6 | -3.14 |
| 30 | -5.7 | -4.13 | -3.43 |
| 40 | -12.35 | -4.9 | -3.8 |
| 50 | -25 | -5.65 | -4.6 |

METHOD FOR DETERMINING A CORRECTED VARIANCE REPRESENTATIVE OF THE CONDITION OF RECEPTION OF SIGNALS REPRESENTATIVE OF SYMBOLS

BACKGROUND OF THE INVENTION

The present invention relates to a method for determining a corrected variance representative of the condition of reception of signals representative of symbols transferred by an emitter to a receiver through a communication channel.

In radio communication systems, the estimation of the radio communication channel response between the emitter and the receiver is an essential operation that is performed at the receiver in order to improve the reception quality of the data by, as example, enabling a coherent demodulation of the received signals.

Generally, the estimation of the radio communication channel response is pilot-aided in the sense that a pilot signal known by the receiver is transmitted by the emitter in order to allow the estimation, at the receiver, of the radio communication channel response between the emitter and the receiver.

One of the most reliable pilot-aided radio communication channel estimator is the Minimum Mean Square Error (MMSE) estimator, also known as Wiener channel estimator. A Wiener channel estimator consists of a linear filter of L coefficients derived according to the minimum mean square error criterion.

A Wiener channel estimator requires the knowledge of the received average signal to interference plus noise ratio (SNR) over pilots and of the channel auto-correlation function. In practice, neither the received average SNR nor the channel auto-correlation function are precisely known.

For the auto-correlation function, a theoretical channel model is generally assumed with parameters determined from the parameters of the system under study. As example, in OFDM system, the radio communication channel is assumed to have rectangular shaped power delay profile with a maximum delay $\tau_{max}$ and a rectangular shaped Doppler power spectrum with a maximum Doppler frequency $f_{D,max}$. The parameters $\tau_{max}$ and $f_{D,max}$ should always be equal or larger than the worst channel conditions.

For the received average SNR, a fixed average signal to interference plus noise ratio value $SNR_w$ is generally used to determine the coefficients of the Wiener channel estimator. The fixed average value $SNR_w$ has to be equal or larger than the actual received average SNR in order to achieve sub-optimal but still robust channel estimation performance in comparison with an optimal Wiener channel estimator. An optimal Wiener channel estimator is a Wiener channel estimator that uses the actual received average SNR to determine the Wiener filter coefficients. An actual value is a value currently received. The fixed average value $SNR_w$ is generally taken greater than an expected received average SNR chosen in a way to ensure optimal performance in the case of favourable transmission conditions.

The performance of the estimation of the radio communication channel response depends then on the channel auto-correlation model and the fixed average value $SNR_w$ used.

The performance of the Wiener channel estimator depends on the actual average received level of interference plus noise over pilots and also on the ratio $R_{boost}$ between pilot signal power to data signal power. The ratio $R_{boost}$, referred to as power boost, is known by the receiver.

The higher the actual average level of interference plus noise is, the lower the channel estimation performance is. The higher the ratio $R_{boost}$ is, the higher the channel estimation performance is.

At the receiver side, some other techniques or operations require the knowledge of the average received level of interference plus noise affecting the data signal in order to improve the reception quality. Examples of these operations are channel equalization and Log Likelihood Ratios (LLR) calculation for soft-in and soft-out channel decoding. So, when the same average received level of interference plus noise affects pilot and data signals, the estimation of the average received level of interference plus noise over pilots becomes vital for the radio communication channel estimation and/or for the channel equalization and/or for the Log Likelihood Ratios calculation.

Furthermore, the average received level of interference plus noise of the signals representative of pilot symbols and/or data symbols is a good indicator of the transmission quality that can be used as an input for efficient resource allocation like scheduling and/or link adaptation like adaptive modulation and/or coding scheme and/or Hybrid-Automatic Repeat reQuest, etc. and/or radio resource management mechanisms like handover, power control, etc.

Thus, the estimation of the average received level of interference plus noise is also vital for resource allocation, link adaptation, and radio resource management mechanisms.

Moreover, if the receiver is able to estimate the variance of channel estimation errors, one can take this information into account to improve the performance of the channel estimation for example through adaptive power boost and also some other receiver algorithms like channel equalization, Log Likelihood Ratios calculation and Channel Quality Indicator estimation.

BRIEF SUMMARY OF THE INVENTION

The aim of the invention is therefore to propose a method and a device which make it possible to determine more accurately than the state of the art at least a variance representative of the condition of reception of signals representative of symbols transferred by an emitter to a receiver through a communication channel of which coefficients affect the received signals.

To that end, the present invention concerns a method for determining a corrected estimated variance representative of the condition of reception of signals representative of symbols transferred by an emitter to a receiver through a communication channel, wherein the method comprises the step, executed by the receiver, of producing an estimation of the variance by a Wiener channel estimator comprising a linear filter of which coefficients are determined at least from a given average signal to interference plus noise ratio value, the method being characterised in that it comprises further step, executed by the receiver, of:

multiplying the estimation of the variance by a correction factor in order to obtain the corrected estimated variance, the value of the correcting factor being dependent at least on the number of coefficients of the linear filter of the Wiener channel estimator.

The present invention concerns also a device for determining a corrected estimated variance representative of the condition of reception of signals representative of symbols transferred by an emitter to a receiver through a communication channel, wherein the device for determining the variance comprises means for producing an estimation of the variance by a Wiener channel estimator comprising a linear filter of which coefficients are determined at least from a given average signal to interference plus noise ratio value, characterised in that the device for determining the corrected estimated variance further comprises means for multiplying the estimation of the variance by a correction factor, the value of the correcting factor being dependent at least on the number of coefficients of the linear filter of the Wiener channel estimator.

Thus, the variance representative of the condition of reception of signals representative of symbols transferred by an emitter to a receiver through a communication channel is determined precisely.

According to a particular feature, the value of the correcting factor is further dependent on the given average signal to interference plus noise ratio value.

Thus, the value of the correcting factor is adapted to the Wiener channel estimator.

According to a particular feature, the variance representative of the condition of reception of signals transferred by the emitter to the receiver through the communication channel is the variance of the interference plus noise.

Thus, the average received level of interference plus noise is determined accurately. A precise knowledge of the average received level of interference plus noise improves the reception quality.

According to a particular feature, the receiver multiplies the corrected estimated variance of the interference plus noise by another correction factor in order to determine a corrected estimated variance of the channel estimation errors, the value of the other correcting factor being dependent on the number of coefficients of the linear filter of the Wiener channel estimator.

Thus, the receiver is able to estimate accurately the variance of channel estimation errors. The receiver can take this information into account to improve the performance of the channel estimation for example through adaptive power boost and also some other receiver algorithms like channel equalization, Log Likelihood Ratios calculation and Channel Quality Indicator estimation.

According to a particular feature, the value of the other correcting factor is further dependent on the given average signal to interference plus noise ratio value.

Thus, the value of the correcting factor is adapted to the Wiener channel estimator.

According to a particular feature, the receiver transfers the corrected estimated variance of the interference plus noise and/or the corrected estimated variance of the channel estimation errors to a channel equalization module and/or to a Log Likelihood Ratios calculation module for soft-in and soft-out channel decoding and/or to a resource allocation module and/or to a scheduling module and/or to a resource management module.

Thus, the reception conditions are improved.

According to a particular feature, signals are representative of pilot symbols and symbols of data and the receiver:
  estimates the energy of the signals representative of pilot symbols,
  calculates, from the estimated energy and the variance of the interference plus noise, an estimate of the average signal to interference plus noise ratio value,
  transfers the signal to another Wiener channel estimator comprising another linear filter of which coefficients are determined according to the calculated estimate of the average signal to interference plus noise ratio value,
  obtains corrected estimated symbols of channel coefficients affecting the received signals.

Thus, the reception of the symbols representative of data is improved.

According to a particular feature, the receiver divides the corrected estimated variance of channel estimation errors with a predetermined threshold for the variance of channel estimation errors on symbols of data in order to obtain a ratio $R_{boost}$ between the energy of the signals representative of pilot symbols and the energy of the signals representative of data symbols.

Thus, the receiver is able to inform the emitter of the value obtained for $R_{boost}$ for use in next transmissions in order to improve channel estimation performance, and hence, the reception quality of symbols representative of data is improved.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

BRIEF DESCRIPTION OF THE SEVERAL
VIEWS OF THE DRAWINGS

Figure 9:
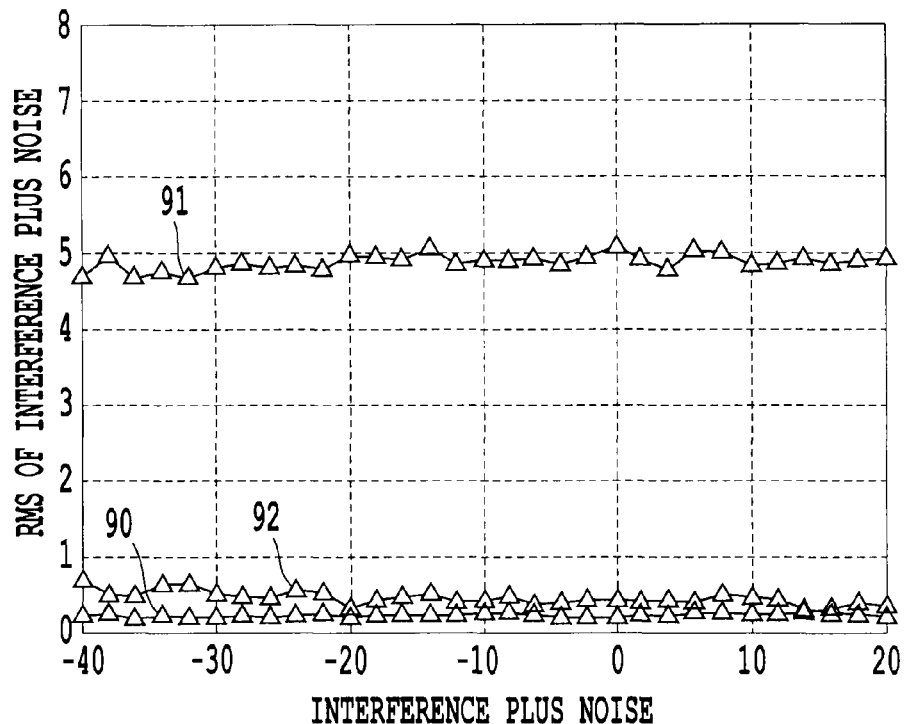
Figure 10:
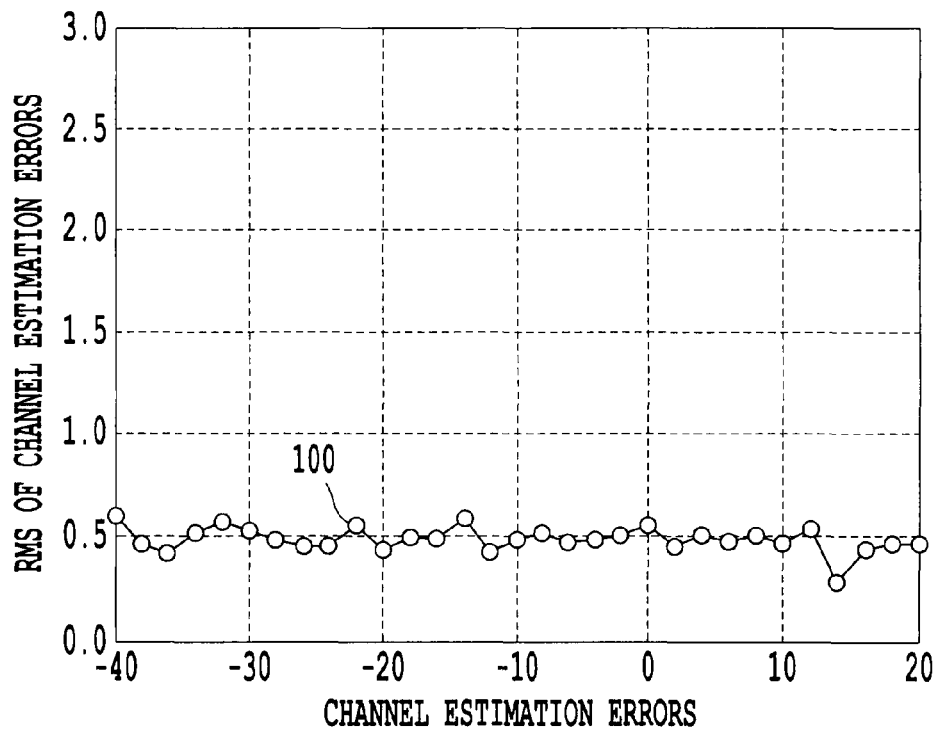
Figure 11:
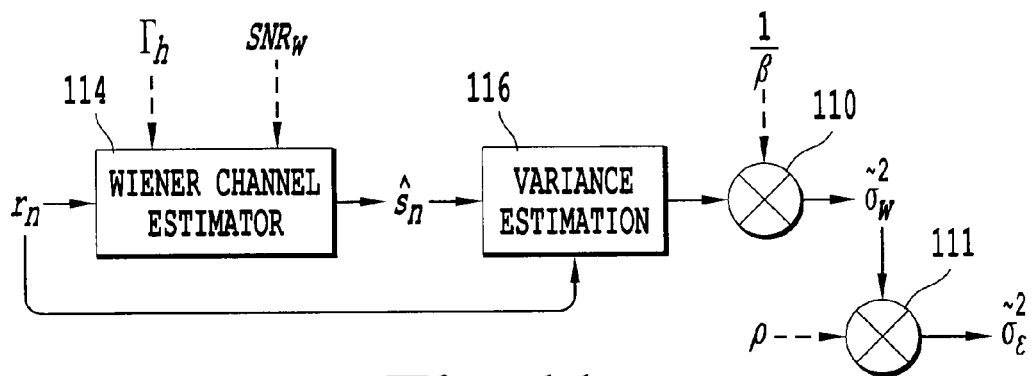
Figure 12:
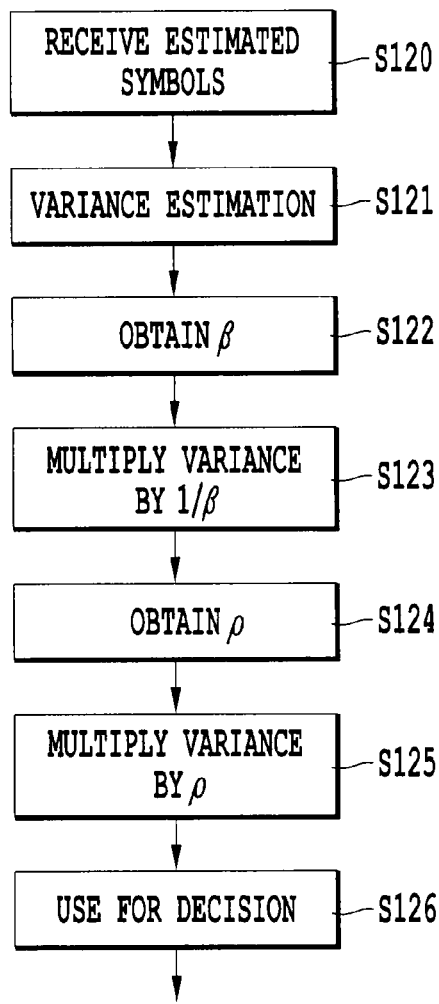
Figure 13:
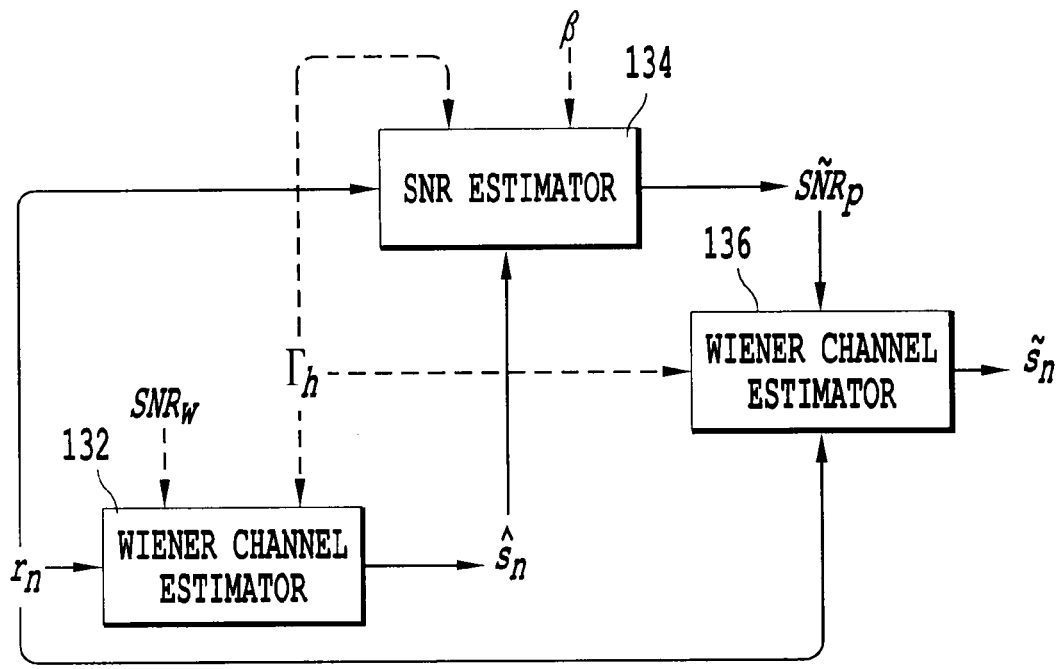
Figure 14:
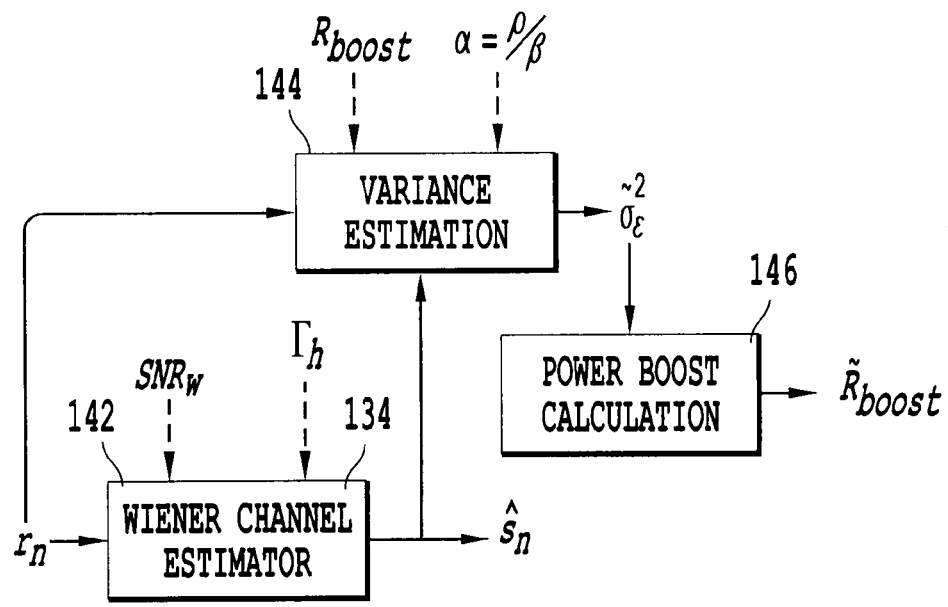

FIG. 9 depicts curves showing variations of the root mean square error of the estimation of the variance of interference plus noise versus different values of the actual variance of the interference plus noise respectively in case of perfect channel estimation, in case of an imperfect channel estimation without any correction, and in case of an imperfect channel estimation with a proper correction by the second correction factor;

FIG. 10 depicts a curve showing variations of the root mean square error of the estimation of the variance of channel estimation errors versus different values of the actual variance of channel estimation errors, where the variance of channel estimation errors is estimated from the corrected estimate of the variance of interference plus noise using the second correction factor and the first correction factor;

FIG. 11 is a block diagram of a first estimation device comprised in the wireless interface of the receiver according to the present invention;

FIG. 12 is an algorithm executed by the receiver according to the present invention;

FIG. 13 is a block diagram of a second estimation device comprised in the wireless interface of the receiver according to the present invention;

FIG. 14 is a block diagram of a third estimation device comprised in the wireless interface of the receiver according to the present invention.

DETAILED DESCRIPTION OF THE INVENTION

Figure 1:
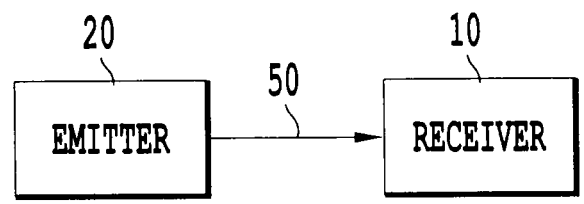
FIG. 1 is a diagram representing the architecture of a radio communication system.

FIG. 1 is a diagram representing the architecture of a radio communication system.

In the radio communication system, an emitter 20 transmits signals to at least a receiver 10 through a radio communication channel 50. The signals are representative of pilot symbols or data. As example and in a non limitative way, the present invention is applicable to orthogonal frequency division multiplexing (OFDM)-based radio communication systems using multiple input multiple output (MIMO) schemes. The present invention is also application to any other communication system.

Figure 2:
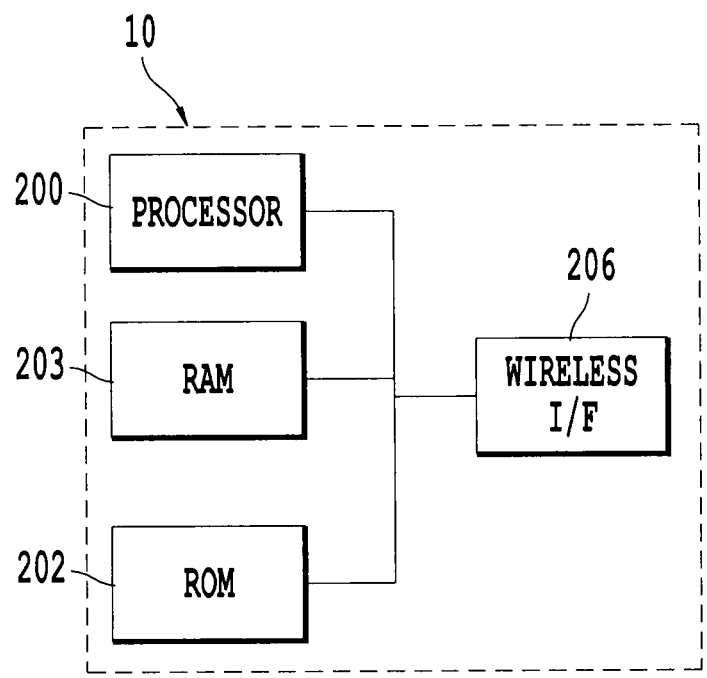
FIG. 2 is a block diagram of a receiver according to the present invention.

FIG. 2 is a block diagram of a receiver according to the present invention.

The receiver 10 has an architecture based on components connected together by a bus 201 and a processor 200 controlled by the program as disclosed in the FIG. 12.

The bus 201 links the processor 200 to a read only memory ROM 202, a random access memory RAM 203 and a wireless interface 206.

The memory 203 contains registers intended to receive variables and the instructions of the program related to the algorithm as disclosed in the FIG. 12.

The processor 200 controls the operation and the wireless interface 206.

Figures 5, 6:
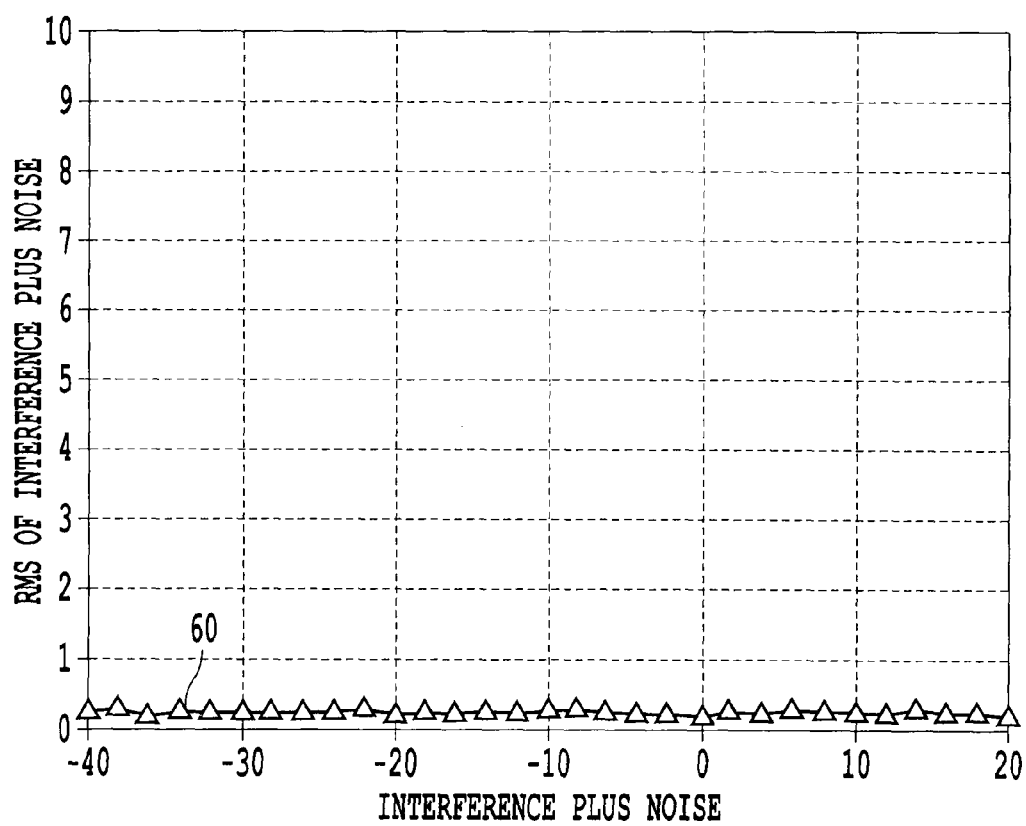
FIG. 5 depicts a table showing different values taken by a first correction factor according to the values of the fixed average $SNR_w$ used by the Wiener channel estimator and/or to the number of coefficients of the linear filter of the Wiener channel estimator.
FIG. 6 depicts a curve showing variations of the root mean square error of the estimation of the variance of interference plus noise versus different values of the actual variance of the interference plus noise in case of a perfect channel estimation at the output of the Wiener channel estimator.
Figures 7, 8:
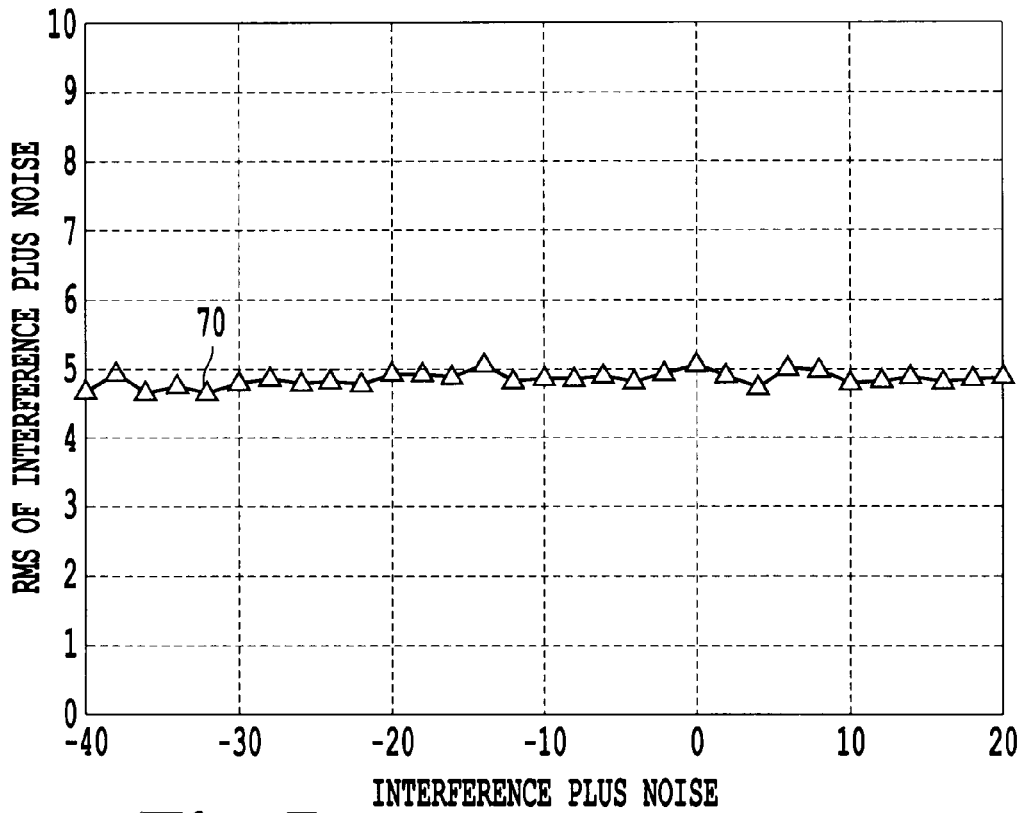
FIG. 7 depicts a curve showing variations of the root mean square error of the estimation of the variance of interference plus noise versus different values of the actual variance of the interference plus noise in case of an imperfect channel estimation at the output of the Wiener channel estimator.
FIG. 8 depicts a table showing different values taken by a second correction factor according to the values of the fixed average value $SNR_w$ used by the Wiener channel estimator and/or to the number of coefficients of the linear filter of the Wiener channel estimator.

The read only memory 202 contains instructions of the program related to the algorithm as disclosed in the FIG. 12, which is transferred, when the receiver is powered on to the random access memory 203 and at least a part of the tables shown in the FIGS. 5 and 8.

The wireless interface 206 comprises at least a Wiener channel estimator defined according to a given channel autocorrelation model and a fixed average value $SNR_w$ which is taken greater than an expected received average SNR chosen in a way to ensure optimal performance in the case of favourable transmission conditions.

At the input of the Wiener channel estimator, the n-th received pilot symbol has the following form:

$$r_n = \sqrt{E_p} h_n p_n + w_n = s_n p_n + w_n; \forall n = 1 \ldots N_p$$

where $N_p$ is the number of received pilot symbols, $E_p$ is the useful received energy of the pilot signal, $h_n$ is the n-th channel coefficient, $p_n$ is the transmitted pilot symbol, and $w_n$ is the interference plus noise term of variance $\sigma_w^2$.

At the output of the Wiener channel estimator, the estimates of the channel coefficients which affect the received signals associated with the $N_p$ pilot symbols and the $N_d$ data symbols are given by:

$$\hat{s}_m = s_m + \epsilon_m; \forall m = 1 \ldots N_p + N_d,$$

where $\epsilon_m$ is the estimation error for m-th coefficient $s_m$.

The variance of channel estimation errors for pilots is given by:

$$\sigma_E^2 = E\{|\epsilon_m|^2\} = E_p E\{|\hat{h}_m - h_m|^2\} = E_p \sigma_{eh}^2,$$

wherein $E\{\}$ is the expectation value, $h_m$ is the m-th channel coefficient, $\hat{h}_m$ is the estimate of the m-th channel coefficient, and $\sigma_{eh}^2$ is the variance of channel estimation errors for the channel coefficients with a normalized received energy equal to one.

The variance of channel estimation errors for data is then given by:

$$\sigma_{ed}^2 = E_d \sigma_{ch}^2 = \frac{E_d}{E_p} \sigma_\epsilon^2 = \frac{1}{R_{boost}} \sigma_\epsilon^2,$$

wherein $R_{boost}$ is the power boost defined as the ratio between the pilot signal energy $E_p$ and the data signal energy $E_d$.

The estimate of the received useful energy of pilot signal is equal to:

$$\hat{E}_p = \left| \frac{1}{\Gamma_h(\Delta)} \frac{1}{N_p} \sum_{n=1}^{N_p-1} r_n r_{n-1}^* \right|,$$

where $\Gamma_h(\Delta)$ denotes the channel auto-correlation for a spacing $\Delta$ between two adjacent pilot symbols and x* denotes the conjugate of x.

The parameter $\Gamma_h(\Delta)$ is known by the Wiener channel estimator. A useful energy comprises only the part of the received energy that is associated with the desired signal, hence it excludes the other parts associated with noise and/or interference affecting the received signal.

If there is a perfect channel estimation at the output of the Wiener channel estimator, an estimate of the variance of interference plus noise can be written as:

$$\hat{\sigma}_w^2 = \frac{1}{N_p} \sum_{n=0}^{N_p-1} |r_n - \hat{s}_n|^2.$$

It has to be noted here that the estimate of the variance of interference plus noise according to the previous formula is biased in case of imperfect channel estimation at the output of the Wiener channel estimator.

Using the estimates of $E_p$ and $\sigma_w^2$, the estimate of actual average SNR can be simply obtained as:

$$\hat{SNR} = \frac{\hat{E}_p}{\hat{\sigma}_w^2}.$$

It has to be noted here that, the performance of any estimation technique is generally assessed by calculating the Root Mean Square (RMS) of the error between the estimate and exact values of the parameter to estimate.

The inventors of the present invention have considered the performances of the Wiener channel estimator using a given channel auto-correlation model and a fixed average value $SNR_w$ both used for the determination of the filter coefficients of the Wiener channel estimator. The performances are considered with respect to the actual received average SNR and the actual variance of interference plus noise at the input of the Wiener channel estimator.

The inventors of the present invention have studied the relationship between the actual variance $\sigma_E^2$ of channel estimation errors and the actual received average SNR at the input of the Wiener channel estimator. Results are shown in FIG. 3.

Figure 3:
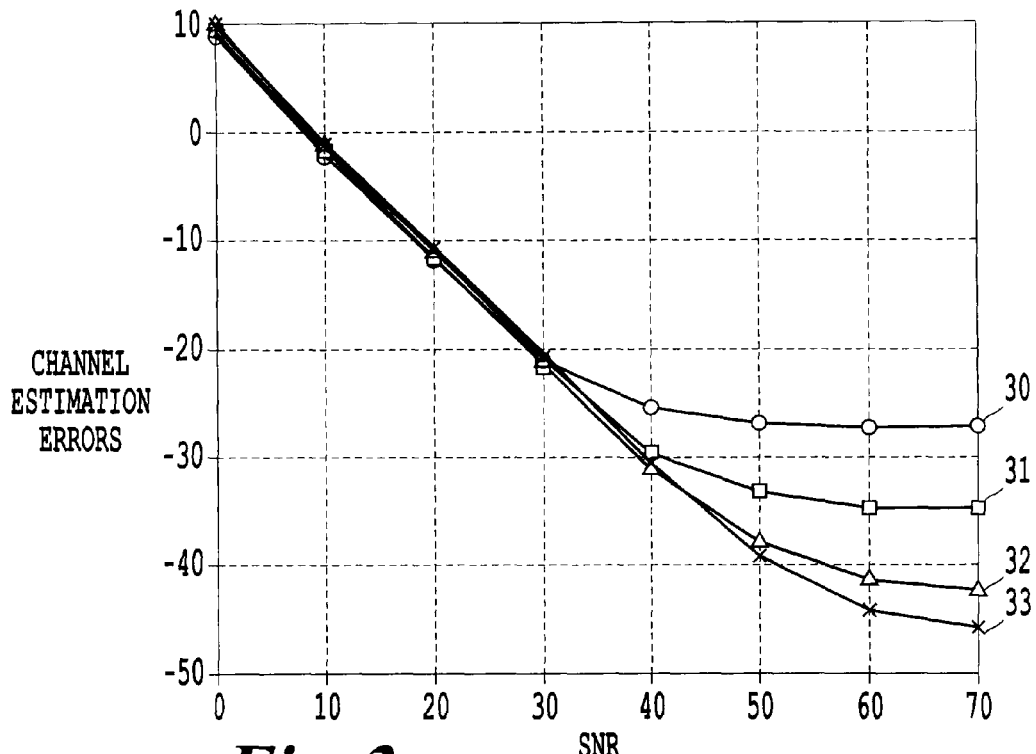
FIG. 3 depicts curves showing variations of actual variance of the channel estimation errors versus different values of the actual average SNR for plural fixed average $SNR_w$ values used by a Wiener channel estimator.

FIG. 3 depicts curves showing variations of the actual variance $\sigma_E^2$ of channel estimation errors versus different values of the actual received average SNR for plural fixed average values $SNR_w$ used by the Wiener channel estimator.

On the horizontal axis, the actual received average SNR values, expressed in decibels, at the input of the Wiener channel estimator are shown.

On the vertical axis, the variations of the actual variance $\sigma_E^2$ of channel estimation errors, expressed in decibels, are shown.

In the FIG. 3, four curves are shown.

The curve noted 30 represents the variations of the actual variance $\sigma_E^2$ of channel estimation errors for a fixed average value $SNR_w$ equal to twenty decibels (dB) which is used by the Wiener channel estimator for determining the filter coefficients.

The curve noted 31 represents the variations of the actual variance $\sigma_E^2$ of channel estimation errors for a fixed average value $SNR_w$ equal to thirty decibels which is used by the Wiener channel estimator for determining the filter coefficients.

The curve noted 32 represents the variations of the actual variance $\sigma_E^2$ of channel estimation errors for a fixed average value $SNR_w$ equal to forty decibels which is used by the Wiener channel estimator for determining the filter coefficients.

The curve noted 33 represents the variations of the actual variance $\sigma_E^2$ of channel estimation errors for a fixed average value $SNR_w$ equal to fifty decibels which is used by the Wiener channel estimator for determining the filter coefficients.

As shown in FIG. 3, we can distinguish two actual received average SNR regions which are separated by the fixed average value $SNR_w$.

In the first region, where the actual received average SNR is less than or equal to the fixed average value $SNR_w$ used by the Wiener channel estimator for determining the filter coefficients, the relationship between the variance $\sigma_E^2$ of channel estimation errors and the actual received average SNR is found linear and very slightly variant with respect to the fixed average value $SNR_w$ used by the Wiener channel estimator for determining the filter coefficients.

In the second region, where the actual received average SNR is greater than the fixed average value $SNR_w$, the relationship tends to be nonlinear and error floor oriented, with an error floor varying with respect to the fixed average value $SNR_w$ used by the Wiener channel estimator for determining the filter coefficients.

Focusing on the linear region where the actual received average SNR is less than or equal to the fixed average value $SNR_w$ used by the Wiener channel estimator for determining the filter coefficients, the inventors of the present invention have analysed the relationship between the actual variance $\sigma_E^2$ of channel estimation errors and the actual variance $\sigma_w^2$ of interference plus noise for different fixed average values $SNR_w$. An example of result for a given fixed average value $SNR_w$ is depicted in FIG. 4.

Figure 4:
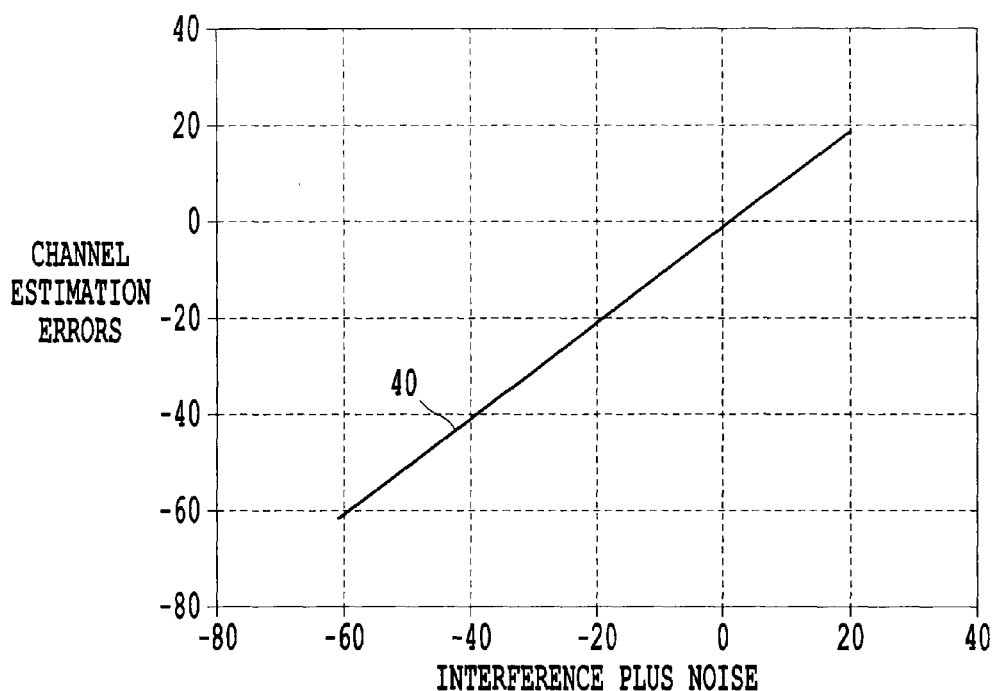
FIG. 4 depicts a curve showing variations of actual variance of the channel estimation errors versus different values of the actual variance of interference plus noise for a given fixed average $SNR_w$ value used by the Wiener channel estimator.

FIG. 4 depicts a curve showing variations of the actual variance $\sigma_E^2$ of channel estimation errors versus different values of the actual variance $\sigma_w^2$ of interference plus noise for a given fixed average value $SNR_w$ used by the Wiener channel estimator.

On the horizontal axis, the variations of the actual variance $\sigma_w^2$ of interference plus noise expressed in decibels are shown.

On the vertical axis, the variations of the actual variance $\sigma_E^2$ of channel estimation errors expressed in decibels are shown.

The curve noted 40 represents the variations of the actual variance $\sigma_E^2$ of channel estimation errors for a fixed average value $SNR_w$ equal to forty decibels and a number of coefficients of the linear filter of the Wiener channel estimator equal to ten.

As one can observe from the FIG. 4, there is a direct linear relationship between the actual variance $\sigma_E^2$ of channel estimation errors and the actual variance $\sigma_w^2$ of interference plus noise.

The inventors have observed similar results for different values of the fixed average value $SNR_w$. The relationship between $\sigma_E^2$ and $\sigma_w^2$ is very slightly variant with respect to the fixed average value $SNR_w$ used by the Wiener channel estimator for determining the filter coefficients.

This relationship can therefore be written as:

$$\sigma_E^2 = \rho \sigma_w^2; \forall SNR \leq SNR_w,$$

where $\rho$ is a first correction factor.

Thus, the first correction factor $\rho$ varies slightly with respect to the fixed average value $SNR_w$ used by the Wiener channel estimator for determining the filter coefficients.

The inventors have found that the first correction factor $\rho$ varies according to the fixed average values $SNR_w$ used by the Wiener channel estimator and/or to the number of coefficients of the linear filter of the Wiener channel estimator as it is shown in the FIG. 5.

FIG. 5 depicts a table showing different values taken by the first correction factor $\rho$ according to the fixed average values $SNR_w$ used by the Wiener channel estimator and/or to the number of coefficients of the linear filter of the Wiener channel estimator.

The table as shown in the FIG. 5 comprises different values of the first correction factor $\rho$ determined by the inventors of the present invention according to a large number of simulations and/or experiments.

Each line of the table of the FIG. 5 shows the values taken by the first correction factor $\rho$ for a given fixed average value $SNR_w$ used by the Wiener channel estimator for determining the filter coefficients.

Each column of the table of the FIG. 5 shows the values taken by the first correction factor $\rho$ for a given number of L coefficients of the linear filter of the Wiener channel estimator.

If we take a look to the values expressed in decibels of the first correction factor $\rho$, they are all negative, which means less than one in a linear scale. Therefore, it is realistic to conclude that $\sigma_w^2$ is greater than $\sigma_E^2$.

Furthermore, more the number L of coefficients is important, less the first correction factor $\rho$ value varies according to the variations of the average value $SNR_w$. For L=10 and 16, an approximation of the first correction factor ρ value could be taken by considering only the number L of coefficients of the linear filter of the Wiener channel estimator. For a more accurate estimation of the first correction factor ρ, the value of the first correction factor ρ should be taken considering the fixed average values $SNR_w$ used by the Wiener channel estimator and the number of coefficients of the linear filter of the Wiener channel estimator.

In another mode of realisation, less accurate than above mentioned but still improving the results given by the state of the art, the first correction factor ρ can be taken considering only the fixed average values $SNR_w$ used by the Wiener channel estimator.

Thus, if we have an accurate estimate or in other words a corrected estimate of the actual variance $\sigma_w^2$ of interference plus noise, thanks to the knowledge of the first correction factor ρ, it is now possible to estimate accurately the variance $\sigma_E^2$ of channel estimation errors or in other words to determine a corrected estimated variance of channel estimation errors.

FIG. 6 depicts a curve showing variations of the root mean square error of the estimation of the variance $\sigma_w^2$ of interference plus noise versus different values of the actual variance of the interference plus noise of $\sigma_w^2$ in case of a perfect channel estimation at the output of the Wiener channel estimator.

On the horizontal axis, the variations of the actual value of the variance $\sigma_w^2$ of interference plus noise expressed in decibels are shown.

On the vertical axis, the variations of the root mean square error of the estimation of the variance $\sigma_w^2$ of interference plus noise expressed in decibels are shown in case of a perfect channel estimation at the output of the Wiener channel estimator.

The curve noted 60 represents the root mean square error of the estimation of the variance $\sigma_w^2$ of interference plus noise versus the actual values of $\sigma_w^2$ in case of a perfect channel estimation at the output of the Wiener channel estimator.

As shown in FIG. 6, in case of perfect channel estimation at the output of the Wiener channel estimator, optimal performance for the estimation of the variance $\sigma_w^2$ of interference plus noise are achieved.

FIG. 7 depicts a curve showing variations of the root mean square error of the estimation of the variance $\sigma_w^2$ of interference plus noise versus different values of the actual variance of the interference plus noise of $\sigma_w^2$ in case of an imperfect channel estimation at the output of the Wiener channel estimator.

On the horizontal axis, the variations of the actual value of variance $\sigma_w^2$ of interference plus noise, expressed in decibels, are shown.

On the vertical axis, the variations of the root mean square error of the estimation of the variance $\sigma_w^2$ of interference plus noise, expressed in decibels, are shown.

The curve noted 70 represents the variations of the root mean square error of the estimation of the variance $\sigma_w^2$ of interference plus noise versus the actual value of $\sigma_w^2$ in case of imperfect channel estimation at the output of the Wiener channel estimator.

As shown in FIG. 7, the variations of the root mean square error keep almost invariant with respect to the actual variance $\sigma_w^2$.

Having observed this, the inventors have studied the relationship between the estimated variance $\hat{\sigma}_w^2$ and the exact variance $\sigma_w^2$ of interference plus noise.

In the case where statistical orthogonality exists between the channel estimation errors and the interference plus noise affecting the received symbols used for providing the estimated variance $\hat{\sigma}_w^2$, the ratio between the estimated variance $\hat{\sigma}_w^2$ and the exact variance $\sigma_w^2$ of interference plus noise can be immediately found constant and equal to 1+ρ with ρ being the first correction factor.

A statistical orthogonality can be obtained using received symbols which are different from symbols received by the Wiener channel estimator.

However, when the received symbols used for providing the estimated variance $\hat{\sigma}_w^2$, are the same as those used by the Wiener channel estimator, the inventors have found that statistical orthogonality does not exist between the channel estimation errors and the interference plus noise affecting the received symbols.

Nevertheless, even in this case, the inventors found that the ratio between the estimated variance $\hat{\sigma}_w^2$ and the exact variance $\sigma_w^2$ of interference plus noise still keep constant similarly to the case of statistical orthogonality. Such ratio is a second correction factor denoted β. Note that in that present case, β is not equal to 1+ρ.

Thus, by applying the second correction factor β it is possible to cancel out the impact of channel estimation errors on the accuracy of estimation of the variance $\sigma_w^2$ of interference plus noise:

$$\tilde{\sigma}_w^2 = \frac{1}{\beta}\hat{\sigma}_w^2,$$

wherein $\tilde{\sigma}_w^2$ is the corrected value of the estimated value $\hat{\sigma}_w^2$ of the variance $\sigma_w^2$ of interference plus noise.

The inventors have found that the second correction factor β is specific to the Wiener channel estimator used and varies according to the fixed average values $SNR_w$ used by the Wiener channel estimator and/or to the number of coefficients of the linear filter of the Wiener channel estimator as it is shown in the FIG. 8.

FIG. 8 depicts a table showing different values taken by the second correction factor β according to the fixed average value $SNR_w$ used by the Wiener channel estimator and/or to the number of coefficients of the linear filter of the Wiener channel estimator.

In FIG. 8, it is considered the case where the same received symbols are used as well as for performing Wiener channel estimation and for providing the estimated variance $\hat{\sigma}_w^2$.

Thus, this corresponds to the case of non statistical orthogonality where the second correction factor β cannot be derived directly from the first correction factor ρ.

The table as shown in the FIG. 8 comprises different values of the second correction factor β determined by the inventors of the present invention according to a large number of simulations and/or experiments.

Each line of the table of the FIG. 8 shows the values, expressed in decibels, taken by the second correction factor β for a given fixed average value $SNR_w$ used by the Wiener channel estimator for determining the filter coefficients.

Each column of the table of the FIG. 8 shows the values, expressed in decibels, taken by the second correction factor β for a given number of L coefficients of the linear filter of the Wiener channel estimator.

If we take a look to the values expressed in decibels of the second correction factor β, more the number L of coefficients is important, less the second correction factor β varies according to the variations of the average value $SNR_w$.

For L=10 and 16, an approximation of the second correction factor β value could be taken by considering only the number L of coefficients of the linear filter of the Wiener channel estimator.

For a more accurate estimation of the second correction factor β, the value of the second correction factor β should be taken considering the fixed average values $SNR_w$ used by the Wiener channel estimator and the number of coefficients of the linear filter of the Wiener channel estimator.

In another mode of realisation, less accurate than above mentioned but still improving the results given by the state of the art, the second correction factor β can be taken considering only the fixed average values $SNR_w$ used by the Wiener channel estimator.

Thus, thanks to the knowledge of the second correction factor β, it is now possible to have a corrected estimate $\tilde{\sigma}_w^2$ of the variance $\sigma_w^2$ of interference plus noise or in other words to estimate accurately the variance $\sigma_w^2$ of interference plus noise.

It has to be noted here that there is no explicit relationship between the values taken by the first and second correction factors except in the case of statistical orthogonality between the channel estimation errors and the interference plus noise affecting the received symbols used for providing the estimated variance $\hat{\sigma}_w^2$. In such a case, the second correction factor β is simply equal to 1+ρ, with ρ being the first correction factor.

FIG. 9 depicts curves showing variations of the root mean square error of the estimation of the variance $\sigma_w^2$ of interference plus noise versus different values of the actual variance $\sigma_w^2$ of the interference plus noise respectively in the case of a perfect channel estimation, in the case of an imperfect channel estimation without any correction, and in the case of an imperfect channel estimation with a proper correction by the second correction factor β.

On the horizontal axis, the variations of the actual value of variance $\sigma_w^2$ of interference plus noise, expressed in decibels, are shown.

On the vertical axis, the variations of the root mean square error of the estimation of the variance $\sigma_w^2$ of interference plus noise, expressed in decibels, are shown.

In the FIG. 9, three curves are shown. The three curves 90, 91 and 92 depict an example wherein a Wiener channel estimator has a filter of length L=10 and wherein the fixed average value $SNR_w$ used by the Wiener channel estimator for determining the filter coefficients is equal to forty decibels.

The curve noted 90 represents the root mean square error of the estimation of the variance $\sigma_w^2$ of interference plus noise versus the actual value of $\sigma_w^2$ in the case of perfect channel estimation.

Perfect channel estimation is an ideal but non feasible case and it refers to the case where the outputs of the channel estimator are free from errors.

The curve noted 91 represents the root mean square error of the estimation of the variance $\sigma_w^2$ of interference plus noise versus the actual value of $\sigma_w^2$ in the case of imperfect channel estimation, where the estimate of $\sigma_w^2$ is calculated without correction by the second correction factor β.

The curve noted 92 represents the root mean square error of the estimation of the variance $\sigma_w^2$ of interference plus noise versus the actual value of $\sigma_w^2$ in the case of imperfect channel estimation, where the estimate of $\sigma_w^2$ is calculated with a proper correction by the second correction factor β equal to −4.9 dB.

As shown in FIG. 9, thanks to the second correction factor β, a near optimal estimation of the variance $\sigma_w^2$ of interference plus noise is achieved or in other words the determination of the corrected estimated variance $\sigma_w^2$ of interference plus noise.

FIG. 10 depicts a curve showing variations of the root mean square error of the estimation of the variance $\sigma_E^2$ of channel estimation errors versus different values of the actual variance $\sigma_E^2$ of the channel estimation errors, where the variance of channel estimation errors is estimated from the corrected estimate of the variance $\sigma_w^2$ of interference plus noise using the second correction factor β and the first correction factor ρ.

On the horizontal axis, the variations of the actual variance $\sigma_E^2$ of channel estimation errors, expressed in decibels, are shown.

On the vertical axis, the variations of the root mean square error of the estimation of the variance $\sigma_E^2$ of channel estimation errors, expressed in decibels, are shown.

In the FIG. 10, the curve noted 100 represents the root mean square error of the estimation of the variance $\sigma_E^2$ of channel estimation errors versus the actual value of $\sigma_E^2$, where the estimate of variance $\sigma_E^2$ is calculated from the corrected estimate of variance $\sigma_E^2$ using a second correction factor β equal to −4.9 dB and from a first correction factor ρ equal to −2 dB.

From the FIG. 10, we can see that an accurate estimation of the variance $\sigma_E^2$ of channel estimation errors is achieved.

FIG. 11 is a block diagram of a first estimation device comprised in the wireless interface of the receiver according to the present invention.

The estimation device receives symbols.

The n-th pilot symbol received by the estimation device has the following form:

$$r_n = \sqrt{E_p} h_n p_n + w_n = s_n p_n + w_n; \forall n = 1 \ldots N_p$$

Each received symbol is transferred to a Wiener channel estimator 114. The coefficients of the filter of Wiener channel estimator 114 are determined from a fixed average value $SNR_w$ and from the channel auto-correlation $\Gamma_h(\Delta)$ for a spacing Δ between two adjacent pilot symbols.

At the output of the Wiener channel estimator 114, the estimates of the channel coefficients associated with the $N_p$ pilot symbols are equal to $\hat{s}_n$ and are transferred to a variance estimation module 116 in combination with the received symbols $r_n$.

The variance estimation module 116 provides a first estimate of the variance $\sigma_w^2$ of interference plus noise according to the following formula:

$$\hat{\sigma}_w^2 = \frac{1}{N_p} \sum_{n=0}^{N_p-1} |r_n - \hat{s}_n|^2.$$

According to the present invention, the estimated variance $\hat{\sigma}_w^2$ of interference plus noise is corrected by 1/β, the inverse of the second correction factor β, using a multiplier 110 in order to form the corrected estimated variance $\tilde{\sigma}_w^2$.

The value of the second correction factor β is equal to the value comprised in the table of the FIG. 8 which corresponds to the fixed average value $SNR_w$ and/or to the number of coefficients of the filter of the Wiener channel estimator 114.

According to the present invention, the corrected estimated variance $\tilde{\sigma}_w^2$ of interference plus noise is multiplied by the first correction factor ρ using a multiplier 111, in order to form the corrected estimated variance $\sigma_E^2$ of channel estimation errors.

The first correction factor ρ is equal to the value comprised in the table of the FIG. 5 which corresponds to the fixed average value $SNR_w$ and/or to the number of coefficients of the filter of the Wiener channel estimator 114.

FIG. 12 is an algorithm executed by the receiver according to the present invention.

At step S120, the estimation device receives symbols.

The n-th pilot symbol received by the estimation device has the following form:

$$r_n = \sqrt{E_p} h_n p_n + w_n = s_n p_n + w_n; \forall n=1 \ldots N_p$$

Each received symbol is transferred to a Wiener channel estimator, the coefficients of which are determined at least from a fixed average value $SNR_w$.

At next step S121, the outputs of the Wiener channel estimator associated with the $N_p$ pilots symbols are used in combination with the received symbols in order to provide a first estimate of the variance $\sigma_w^2$ of interference plus noise according to the following formula:

$$\hat{\sigma}_w^2 = \frac{1}{N_p} \sum_{n=0}^{N_p-1} |r_n - \hat{s}_n|^2.$$

At next step S122, the value of the second correction factor β is obtained. The value of the second correction factor β is equal to the value comprised in the table of the FIG. 8 which corresponds to the fixed average value $SNR_w$ and/or to the number of coefficients of the filter of the Wiener channel estimator.

At next step S123, the first estimate of the variance $\sigma_w^2$ of interference plus noise obtained at step S121 is multiplied by 1/β in order to form the corrected estimated variance $\tilde{\sigma}_w^2$ of interference plus noise.

At next step S124, the value of the first correction factor ρ is obtained. The value of the first correction factor ρ is equal to the value comprised in the table of the FIG. 5 which corresponds to the fixed average value $SNR_w$ and/or to the number of coefficients of the filter of the Wiener channel estimator.

At next step S125, the corrected estimated variance $\tilde{\sigma}_w^2$ of interference plus noise obtained at step S123 is multiplied by ρ in order to obtain the corrected estimated variance $\tilde{\sigma}_w^2$ of channel estimation errors.

At next step S126, the corrected estimated variance $\tilde{\sigma}_w^2$ of channel estimation errors and/or the corrected estimated variance $\tilde{\sigma}_w^2$ of interference plus noise are used by the receiver 10.

The corrected estimated variance $\tilde{\sigma}_w^2$ of interference plus noise and/or the corrected estimated variance $\tilde{\sigma}_E^2$ of channel estimation errors are used, as example and in a non limitative way, to improve channel estimation performance by performing another Wiener channel estimator with an accurate estimate of the actual received average SNR instead of fixed average value $SNR_w$ and/or to determine the ratio $R_{boost}$ of pilot signal power to data signal power in order to improve the performance of Wiener channel estimator and/or to improve performance of channel equalization and/or to provide accurate Log Likelihood Ratios for soft-in and soft-out channel decoding and/or for resource allocation techniques like scheduling, link adaptation like adaptive modulation and coding, Hybrid-Automatic Repeat reQuest, etc. and/or for radio resource management mechanisms like handover, power control, etc.

FIG. 13 is a block diagram of a second estimation device comprised in the wireless interface of the receiver according to the present invention.

The estimation device receives symbols.

The n-th pilot symbol received by the estimation device has the following form:

$$r_n = \sqrt{E_p} h_n p_n + w_n = s_n p_n + w_n; \forall n=1 \ldots N_p$$

Each received symbol is transferred to a Wiener channel estimator 132. The coefficients of the filter of the Wiener channel estimator 132 are determined from a fixed average value $SNR_w$ and from the channel auto-correlation $\Gamma_h(\Delta)$ for a spacing Δ between two adjacent pilot symbols.

At the output of the Wiener channel estimator 132, the estimates of the channel coefficients associated with the $N_p$ pilots symbols are equal to $\hat{s}_n$ and are transferred to SNR estimator 134 in combination with the channel auto-correlation $\Gamma_h(\Delta)$.

The SNR estimator 134, using the received pilot symbols and channel auto-correlation $\Gamma_h(\Delta)$ estimates the useful received energy of pilot signals according to the following formula:

$$\hat{E}_p = \left| \frac{1}{\Gamma_h(\Delta)} \frac{1}{N_p} \sum_{n=1}^{N_p-1} r_n r_{n-1}^* \right|.$$

The SNR estimator 134, using the received pilot symbols $r_n$ at the input of the Wiener channel estimator 132 and the estimates $\hat{s}_n$ at the output of the Wiener channel estimator 132, provides a first estimate $\hat{\sigma}_w^2$ of the variance of interference plus noise according to the following formula:

$$\hat{\sigma}_w^2 = \frac{1}{N_p} \sum_{n=0}^{N_p-1} |r_n - \hat{s}_n|^2.$$

The SNR estimator 134 corrects then the estimated variance $\hat{\sigma}_w^2$ of interference plus noise by multiplying it by 1/β, the inverse of the second correction factor β, in order to form the corrected estimated variance $\tilde{\sigma}_w^2$ of interference plus noise.

The value of the second correction factor β is equal to the value comprised in the table of the FIG. 8 which corresponds to the fixed average value $SNR_w$ and/or the number of coefficients of the filter of the Wiener channel estimator 132.

Using the estimate $\hat{E}_p$ of useful received pilot energy $E_p$ and the corrected estimate $\tilde{\sigma}_w^2$ of $\sigma_w^2$, the SNR estimator 134 calculates then a corrected estimate $S\tilde{N}R$ of the actual received average SNR using the following formula:

$$S\tilde{N}R = \frac{\hat{E}_p}{\tilde{\sigma}_w^2}.$$

The corrected estimate $S\tilde{N}R$ is transferred to a second Wiener channel estimator 136. The coefficients of the filter of the Wiener channel estimator 136 are determined from the corrected estimate $S\tilde{N}R$ and from the channel auto-correlation $\Gamma_h(\Delta)$ in order to provide the corrected estimates $\tilde{s}_n$ of the channel coefficients $s_n$.

FIG. 14 is a block diagram of a third estimation device comprised in the wireless interface of the receiver according to the present invention.

The estimation device receives symbols.

The n-th pilot symbol received by the estimation device has the following form:

$$r_n = \sqrt{E_p} h_n p_n + w_n = s_n p_n + w_1; \forall n=1\ldots N_p$$

Each received symbol is transferred to a Wiener channel estimator 142. The coefficients of the filter of the Wiener channel estimator 142 are determined from a fixed average value $SNR_w$ and from the channel auto-correlation $\Gamma_h(\Delta)$ for a spacing $\Delta$ between two adjacent pilot symbols.

At the output of the Wiener channel estimator 142, the estimates of the channel coefficients associated with the $N_p$ pilots symbols are equal to $\hat{s}_n$ and are transferred to a variance estimation module 144 in combination with the received symbols.

The variance estimation module 144 provides a first estimate of the variance of interference plus noise according to the following formula:

$$\hat{\sigma}_w^2 = \frac{1}{N_p}\sum_{n=0}^{N_p-1}|r_n - \hat{s}_n|^2.$$

According to the present invention, the estimated variance $\hat{\sigma}_w^2$ of interference plus noise is corrected by $1/\beta$, the inverse of the second correction factor $\beta$, in order to form the corrected estimated variance $\tilde{\sigma}_w^2$ of interference plus noise.

The value of the second correction factor $\beta$ is equal to the value comprised in the table of the FIG. 8 which corresponds to the fixed average value $SNR_w$ and the number of coefficients of the filter of the Wiener channel estimator 142.

The variance estimation module 144 obtains the value of the first correction factor $\rho$. The value of the first correction factor $\rho$ is equal to the value comprised in the table of the FIG. 5 which corresponds to the fixed average value $SNR_w$ and the number of coefficients of the filter of the Wiener channel estimator 142.

The variance estimation module 144 multiplies by the first correction factor $\rho$ the corrected estimated variance $\tilde{\sigma}_w^2$ of interference plus noise in order to obtain the corrected estimated variance $\tilde{\sigma}_E^2$ of channel estimation errors.

The power boost calculation module 146, using the corrected estimated variance $\tilde{\sigma}_E^2$ of channel estimation errors and a predetermined threshold $\sigma_{ed,th}^2$ for the variance of channel estimation errors on data, calculates the ratio $R_{boost}$ between the pilot signal energy $E_p$ and the data signal energy $E_d$ according to the following formula:

$$\tilde{R}_{boost} = \frac{\tilde{\sigma}_s^2}{\sigma_{ed,th}^2}.$$

The ratio $\tilde{R}_{boost}$ is then transferred to the emitter through the communication channel.

Naturally, many modifications can be made to the embodiments of the invention described above without departing from the scope of the present invention.

The invention claimed is:

1. A method for determining a corrected estimated variance representative of a condition of reception of signals representative of symbols transferred by an emitter to a receiver through a communication channel, wherein the method executed by the receiver comprises:
producing an estimation of a variance, by a Wiener channel estimator comprising a linear filter of which coefficients are determined at least from a given average signal to interference plus noise ratio value, so that an accuracy of the estimation of the variance increases as a number of the coefficients of the linear filter increases; and
multiplying the estimation of the variance by a correction factor, the value of the correction factor being dependent at least on the number of coefficients of the linear filter of the Wiener channel estimator, wherein the value of the correction factor is further dependent on the given average signal to interference plus noise ratio value.

2. The method according to claim 1, wherein the variance representative of the condition of reception of signals transferred by the emitter to the receiver through the communication channel is the variance of the interference plus noise.

3. The method according to claim 2, further comprising:
multiplying the corrected estimated variance of the interference plus noise by another correction factor in order to determine a corrected estimated variance of the channel estimation errors, the value of the other correction factor being dependent on the number of coefficients of the linear filter of the Wiener channel estimator.

4. The method according to claim 3, wherein the value of the other correction factor is further dependent on the given average signal to interference plus noise ratio value.

5. The method according to claim 2, further comprising:
transferring the corrected estimated variance of the interference plus noise and/or the corrected estimated variance of the channel estimation errors to a channel equalization module and/or to a Log Likelihood Ratios calculation module for soft-in and soft-out channel decoding and/or to resource allocation module and/or to a link adaptation module and/or to a resource management module.

6. The method according to claim 2, wherein,
signals are representative of pilot symbols and symbols of data, and
the method further comprises:
estimating an energy of the signals representative of pilot symbols;
calculating, from the estimated energy and the corrected estimated variance of the interference plus noise, an estimate of the average signal to interference plus noise ratio value;
transferring the signal to another Wiener channel estimator comprising another linear filter of which coefficients are determined according to the calculated estimate of the average signal to interference plus noise ratio value; and
obtaining corrected estimated symbols of channel coefficients affecting the received signals.

7. The method according to claim 3, further comprising:
dividing the corrected estimated variance of channel estimation errors with a predetermined threshold for the variance of channel estimation errors on symbols of data in order to obtain a ratio $R_{boost}$ between an energy of the signals representative of pilot symbols and an energy of the signals representative of data symbols.

8. The method according to claim 1, further comprising:
selecting a correction factor value for the correction factor from an index of predetermined correction factor values, the index correlating average signal to interference plus noise ratio values and number of the coefficients of the linear filter values to correction factor values.

9. The method according to claim 1, wherein the average signal to interference plus noise ratio and the number of the coefficients of the linear filter correlate to a value of the correction factor, such that the value of the correction factor decreases as the number of the coefficients of the linear filter increases.

10. The method according to claim 1, wherein the average signal to interference plus noise ratio and the number of the coefficients of the linear filter correlate to a value of the correction factor, such that the value of the correction factor increases as the average signal to interference plus noise ratio increases.

11. The method according to claim 1, wherein the average signal to interference plus noise ratio and the number of the coefficients of the linear filter correlate to a value of the correction factor, such that the value of the correction factor decreases as the number of the coefficients of the linear filter increases, and such that the value of the correction factor increases as the average signal to interference plus noise ratio increases.

12. A non-transitory computer readable storage medium storing program instructions which can be directly loadable into a programmable device, for implementing the method according to claim 1 when the program instructions are executed on a programmable device.

13. A device for determining a corrected estimated variance representative of a condition of reception of signals representative of symbols transferred by an emitter to a receiver through a communication channel, wherein the device for determining the corrected estimated variance comprises:

an estimator to produce an estimation of a variance by a Wiener channel estimator comprising a linear filter of which coefficients are determined at least from a given average signal to interference plus noise ratio value, so that an accuracy of the estimation of the variance increases as a number of the coefficients of the linear filter increases; and a multiplier to multiply the estimation of the variance by a correction factor, the value of the correction factor being dependent at least on the number of coefficients of the linear filter of the Wiener channel estimator, wherein the value of the correction factor is further dependent on the given average signal to interference plus noise ratio value.

* * * * *